INVENTORS
KEITH S. PENNINGTON
ROBERT V. POLE

United States Patent Office 3,560,070
Patented Feb. 2, 1971

3,560,070
METHOD FOR MAKING SECONDARY HOLOGRAMS FROM MULTIPLEXED HOLOGRAMS OR INTEGRAL PHOTOGRAPHS WHEREIN THE SCREEN EFFECT IS ELIMINATED
Keith S. Pennington, Putnam Valley, and Robert V. Pole, Yorktown Heights, N.Y., assignors to International Business Machines Corporation, Armonk, N.Y., a corporation of New York
Filed Mar. 13, 1968, Ser. No. 712,671
Int. Cl. G02b 27/00
U.S. Cl. 350—3.5    6 Claims

ABSTRACT OF THE DISCLOSURE

A method is described for forming secondary holograms from either a multiplexed (i.e. sampled) hologram or from an integral photograph wherein the screen effect normally produced by either the multiplexed hologram or the integral photograph is eliminated. An integral photograph is a photographic recording of an object through a plane array of fly's eye lenses from which three-dimensional real and virtual images can be later observed. A multiplexed or sampled hologram is a hologram which is formed by interlacing a plurality of holograms on a single emulsion using a mask placed in the reference and/or the integral photograph is eliminated. An integral photograph or hologram of an integral photograph, a screen or grid effect is produced due to the fact that the fly's eye lens array is discontinuous and the areas between the lenses in the array do not record any information. In observing the image from a multiplexed hologram, a similar screen or grid effect appears due to the fact that a mask was employed in producing the multiplexed hologram.

In the method of the present invention, a secondary hologram is recorded in the Fourier transform plane of the image and the secondary hologram plate is translated in the Fourier plane a number of times and a separate recording of the image is superimposed for each translation. Since the secondary hologram plate is in the Fourier plane of the image, the image does not shift due to the translation of the plate. However, since the secondary hologram plate is not in the Fourier plane of the integral photograph or the multiplexed hologram as the case may be, the grid will be recorded at different locations on the secondary hologram for each translation, that is, the grid will shift due to the translation of the hologram. The shifting of the grid for the successive recordings will cause it to smear out and will not be viewable in the resultant secondary hologram.

BACKGROUND OF THE INVENTION

Field of the invention

The present invention relates to a class of articles and processes peculiar to pictures made by the action of light upon a medium sensitive to it and to the production of these pictures. The present invention relates more particularly to the formation of holograms.

Description of the prior art

One of the aspects of the present invention is that a hologram is formed on a photographic plate located in the Fourier transform plane of an object. The formation of holograms on photographic plates located in a Fourier transformed plane is discussed in the book "An Introduction to Coherent Optics and Holography" by George W. Stroke, copyright 1966 by Academic Press, Inc., Library of Congress Catalog Card No. 65–28633. In this reference, the hologram is formed in the Fourier plane so that better use may be made of the photographic plate, that is, better recordings are produced on lower resolution plates. The reference does not discuss translating the plate within the Fourier plane for the purposes of eliminating screen effects.

In copending application, Ser. No. 558,871 entitled "Optical Device and Methods Therefor," filed June 20, 1966 by R. V. Pole and assigned to the present assignee, a method is described for forming a hologram using a version of an integral photograph. In the copending application, the hologram is not shown to be in the Fourier plane and is not translated and will, therefore, exhibit the screen effect.

A multiplexed hologram is described in the article "Multicolor Imaging From Holograms Formed on Two Dimensional Media" by R. J. Collier and K. S. Pennington, published in the Journal of Applied Optics, vol. 6, No. 6, June 1967, pp. 1091–1095.

An integral photograph is discussed in the article "Optical Properties of a Lippmann Lenticulated Sheet" by Herbert E. Ives, Journal of the Optical Society of America, vol. 21, March 1931, pp. 171–176.

SUMMARY OF THE INVENTION

Secondary holograms can be made from either a multiplexed hologram or from an integral photograph, both of which can be described as a photographic recording of sampled wavefronts.

In forming the secondary hologram from images from either of these devices, the sampling function produces a screen or grid effect which is recorded along with the image. This grid or screen effect is due to the fly's eye lenses employed in the integral photograph or the separation mask in the multiplexed hologram. It is an undesirable effect which is disconcerting to the viewer.

An object of the present invention is to provide a method wherein this screen effect is eliminated in the secondary hologram. The method involves the recording of the secondary hologram in the Fourier transform plane of the image produced by either the integral photograph or the multiplexed hologram. The photographic plate for this secondary hologram is translated a plurality of times within the Fourier plane and a separate recording is made for each translation. Since the image is translationally invariant within the Fourier plane, the image will not shift position for each recording, that is, each successive recording of the image will be superimposed on the others.

The secondary hologram plate, however, is not in the Fourier plane of either the integral photograph or the multiplexed hologram (whichever is being used). Thus, the screen effect produced by such devices will shift in position for each successive recording and will, therefore, smear out and not be viewable in the resultant secondary hologram.

The foregoing and other objects, features and advantages of the invention will be apparent from the following more particular description of a preferred embodiment of the invention, as illustrated in the accompanying drawing.

DESCRIPTION OF THE PREFERRED EMBODIMENTS

Figure 1:
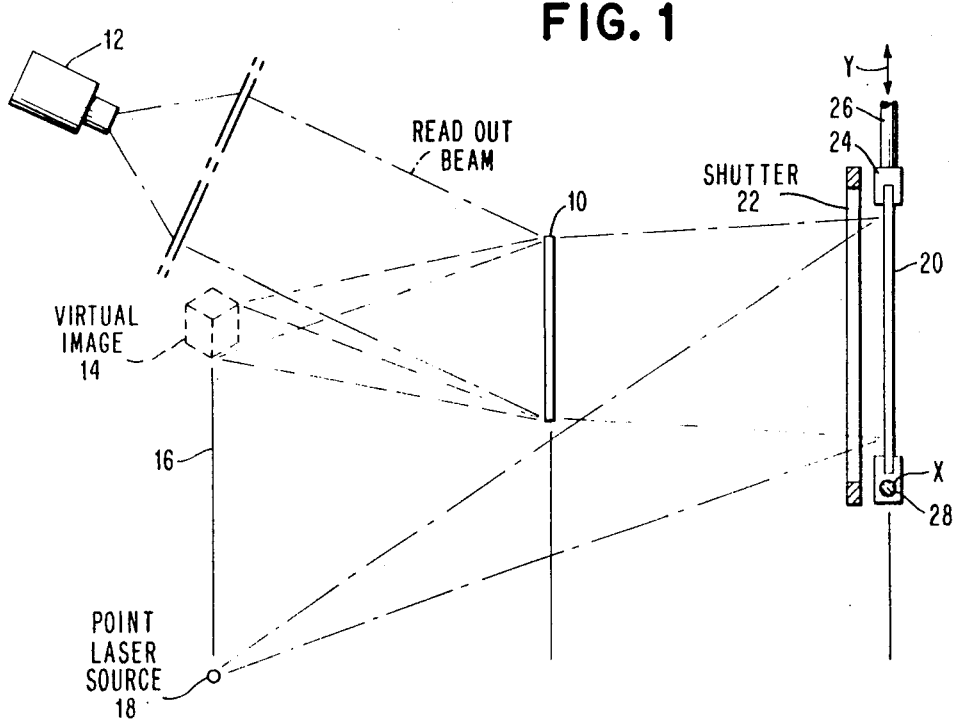
FIG. 1 is a schematic drawing of the formation of a secondary hologram in the Fourier transform plane of an image wherein the Fourier plane is produced by locating an illumination point source in the median plane of the image.

It has been previously described that a secondary hologram can be formed from either an integral photograph of the type described in the referenced article by Herbert E. Ives or from a multiplexed hologram of the type described in the referenced article by Collier and Pennington. Each of these devices is a photographic recording of sampled wavefronts. Due to inherent features of the integral photograph and the multiplexed hologram, the resultant secondary hologram will normally have recorded thereon an undesired screen or grid image due to the sampling function. This is due, in the case of the integral photograph, to the fact that the integral photograph is formed through a plane containing a plurality of small lenses of the type known as fly's eye lenses. The grid effect results from the fact that no information is recorded in the photograph for the areas between the lenses. In the multiplexed holograms, the grid is the result of the formation of the hologram through a mask placed in the reference beam and/or subject beam.

In the present invention, the photographic plate on which the secondary hologram is to be formed is placed in the Fourier transform plane of the image produced from either the integral photograph or the multiplexed hologram, depending on which is being used. The interference pattern produced by the image wavefronts and a reference beam are photographically recorded on the photographic plate a plurality of times. For each recording the photographic plate is translated a different distance within the Fourier plane. The photographic plate is translated in the X direction, the Y direction or combinations of both. All translations, however, are within the Fourier plane. The position of the interference pattern of the image and the reference beam in the Fourier transform plane for each recording is not affected by the translations, that is, the pattern in the Fourier transform plane is positionally invariant. Thus, all the components of the multiple exposed secondary hologram reconstruct the median plane of the image at the same position.

The Fourier transform relationship between the median plane of the image and the recording plane of the secondary hologram insures that all of the superimposed holograms reconstruct the median plane of the image at identical positions. The individual components of the hologram are reconstructed, however, with a linear phase shift between the various components. The magnitude of this phase shift depends on the extent to which the photographic plate was translated. This linear phase shift gives rise to linear interference fringes which are in focus at the median plane. If the photographic plate is translated a sufficient distance, these fringes will not be able to be resolved by the eye of an observer.

Points which are away from the median plane will be translated in the reconstructed images and will exhibit a loss in resolution. The further these points are away from the median plane, the larger will be the loss in resolution. Since the image of the fly's eye lens array (grid) of the integral photograph or the mask (grid) of the multiplexed hologram is well removed from the median plane of the object image, the superposition of the grid in the reconstruction of the multiple exposed secondary hologram will, therefore, give several images of the grid, each displaced relative to the other because no Fourier transform relation exist between the plane of the grid and the plane of the secondary hologram. The image of the grid is, therefore, completely smeared out in the reconstruction from the secondary hologram. The result of the present method is a production of a hologram which provides a viewable image without the appearance of a grid.

Referring to FIG. 1, an embodiment of the present invention is shown wherein the Fourier transform relation between the plane of the secondary hologram and the median plane of the image is produced by locating a point laser source in the median plane of the image. Referring to FIG. 1, element 10 is either the aforesaid integral photograph or multiplexed hologram. As is well-known in the art, when element 10 is illuminated by a coherent read-out beam, for example, a beam from laser 12, a real image and a virtual image of the subject of the photograph or multiplexed hologram is produced. In the present discussion, reference is made to the virtual image, however, the present invention may also utilize the real image. The virtual image 14 appears in space at a distance equal to the distance between the actual subject and the element 10 when initially recorded or photographed. The virtual image 14 is three-dimensional and will have some central or median plane 16.

A point laser source 18 is located in this median plane 16. The point laser source 18 may be provided from a laser with a converging lens such that the laser light converges to a point 18 in median plane 16. Point laser source 18 may be provided by the light from laser 12 directed through suitable beam splitters and lenses in a manner well known to those skilled in the art. The wavefront from the three-dimensional virtual image 14 is directed onto a photographic plate 20 along with the illumination from point laser source 18 to form an interference pattern and be recorded as a hologram. It is well known that if point laser source 18 is located in the median plane of the image 14, a Fourier transform relationship exists between the median plane of the image 14 and the plane of the photographic plate 20 (see chapter VI, paragraph 3.1 of the referenced text by G. W. Stroke).

The interference pattern between the virtual image wavefronts and the point laser source illumination will be recorded on the photographic plate 20. However, the recording actually consists of a plurality of separate superimposed recordings each with the photographic plate translated within the Fourier plane by a different distance for each recording. There are a number of ways of accomplishing the recording steps, however, a simple arrangement is shown in FIG. 1 wherein a shutter 22 is placed in front of photographic plate 20 in order to permit a plurality of separate exposures and photographic plate 20 is mounted in a frame 24 which may be moved on rods 26 and 28 such that the photographic plate 20 may be located at desired coordinates within the Fourier plane. It should be appreciated that the translation of photographic plate 20 can be performed automatically by a control system or, if necessary, the translation could be performed by hand without the aid of any apparatus.

It has been found that the number of superimposed recordings is dependent on the desired quality of the resultant secondary hologram and also that the various distances that the photographic plate 20 is translated be made random to avoid the possibility that components of the plurality of interference patterns may add in phase and degrade the images with an observable interference pattern. To illustrate a typical example with a rectangular photographic plate having dimensions of five inches by four inches and located in a plane two feet from the virtual image, it has been found that a series of translations in the Fourier plane varying between 20 mils and 150 mils was effective.

After the series of exposures are made, the photographic plate 20 is photographically processed in a conventional manner and a hologram is produced with a viewable image but with no screen effect.

Figure 2:
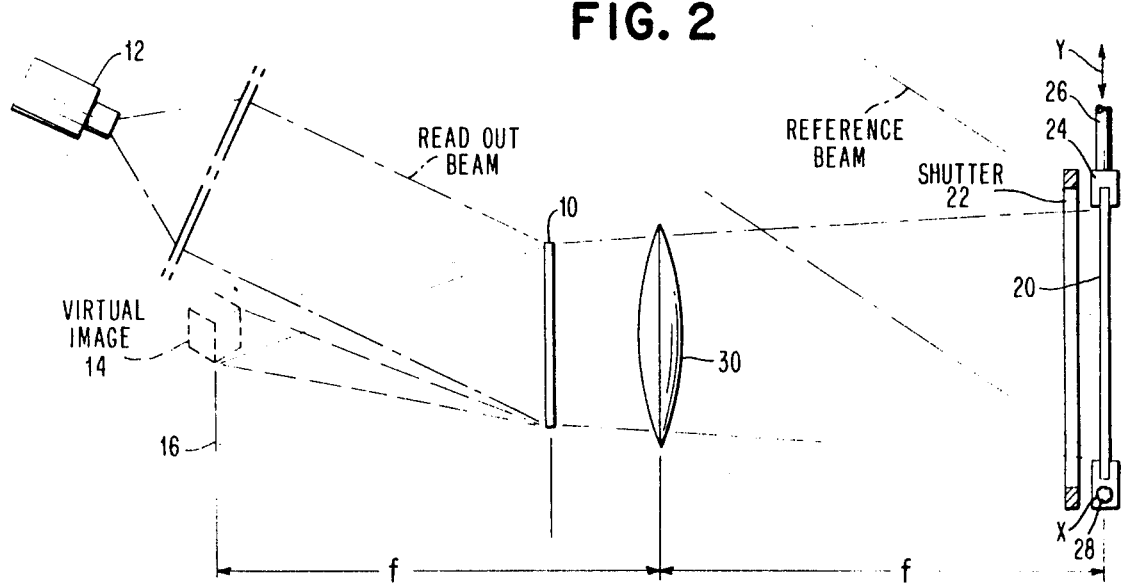
FIG. 2 is a schematic drawing of the formation of a secondary hologram in the Fourier transform plane of an image wherein the Fourier plane is produced by a lens.

Referring to FIG. 2, another embodiment of the invention is shown wherein the Fourier transform plane is obtained by means of a lens 30. However, the principles of the invention are the same as described for FIG. 1. In FIG. 2, element 10 again represents either an integral photograph or a multiplexed hologram which when illuminated with a beam from laser 12 produces a virtual image 14 of the original subject. The wavefronts of image 14 are collected by a lens 30 located one focal length distance from the median plane of image 14. The photographic plate 20 is located in a plane at one focal length distance on the other side of the lens.

It is well established that with an optical arrangement as shown in FIG. 2, a Fourier transform relationship exists between the median plane 16 of the image 14 and the plane of the photographic plate 20. The wavefronts from image 14 are directed through lens 30 onto photographic plate 20 and at the same time a coherent reference beam 32 is also directed onto the photographic plate 20. The coherent reference beam must be in phase with the beam from laser 12 and may, in fact, be obtained from laser 12 via a beam splitting arrangement. The wavefronts from image 14 and the reference beam 32 produce an interference pattern which is recorded on the photographic plate in a series of separate exposures by means of shutter 22. As described for the embodiment of FIG. 1 for each separate exposure, the photographic plate is translated in the Fourier transform plane. Since the median plane of the image 14 and the plane of the photographic plate 20 bear a Fourier transform relationship, a superimposed hologram of the image 14 will be recorded with no shift due to the translation. However, the grid image of the element 10 will give rise to linear interference fringes which are not in focus and which will smear and be unobservable in the resultant hologram.

What has been described has been a method for producing holograms from either a multiplexed hologram or an integral photograph wherein the usual grid or screen effect is eliminated. The elimination of the screen effect is accomplished by recording the secondary hologram of the image of the multiplexed hologram or the integral photograph in the plane which has a Fourier transform relationship with the image but which does not have a Fourier transform relationship with the image of the grid. By translating the photographic plate in the Fourier transform plane and recording a plurality of exposures, the grid image which is not positionally invariant is caused to smear out.

Modifications cen be made within the scope of the present invention. For example, since the illumination of element 10 produces a real image in addition to virtual image 14, a hologram can be made of the wavefronts of the real image with modifications in the optical arrangement, provided that the photographic plate 20 is located in a plane that bears a Fourier transform relationship with the median plane of the real image.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A method of making a hologram comprising the steps of:
   illuminating a photographic recording of sampled wavefronts recorded in an array of separate, relatively small areas on the recording with a coherent readout beam to form an image and an associated screen effect;
   locating a planar photographic emulsion in the path of said readout beam after it has been modulated by said photographic recording;
   illuminating said photographic emulsion with a reference point source of light coherent with said readout beam and located substantially in the median plane of said formed image to form an interference pattern with said readout beam, whereby a lensless Fourier transform hologram can be recorded on said emulsion;
   recording said interference pattern on said photographic emulsion by a plurality of exposures including the steps of maintaining the position of said readout beam and said point source constant for all exposures;
   and translating said photographic emulsion within its own plane between each separate exposure to produce a hologram wherein said screen effect is eliminated.

2. The method of claim 1 wherein said photographic recording of sampled wavefronts is a multiplexed hologram.

3. The method of claim 1 wherein said photographic recording of sampled wavefronts is an integral photograph.

4. The method of claim 1 wherein said image formed by illuminating said photographic recording of sampled wavefronts is a virtual image.

5. A method of making a hologram comprising the steps of:
   illuminating a photographic recording of sampled wavefronts recorded in an array of separate, relatively small areas on the recording, with a coherent readout beam to form an image and an associated screen effect;
   forming a Fraunhofer diffraction pattern of said image in a plane;
   locating a planar photographic emulsion substantially in said plane;
   recording said diffraction pattern on said photographic emulsion by a plurality of separate exposures including the steps of illuminating said photographic emulsion with a reference beam of illumination coherent with said readout beam during each separate exposure, the position of said readout beam and said reference beam being the same for all separate exposures;
   and translating said photographic emulsion within its own plane between each separate exposure to produce a hologram wherein said screen effect is eliminated.

6. The method of claim 5 wherein a lens is located equidistant between said image and said photographic emulsion and wherein said photographic emulsion is located in a plane which is spaced from the median plane of said image by two focal lengths of said lens.

References Cited

Armitage et al.: Applied Optics, vol. 4, No. 4, April 1965, pp. 461–467.

Morgenstern et al.: Jour. of the Optical Society of America, vol. 54, No. 10, October 1964, pp. 1282–1283.

Burckhart: Jour. of the Optical Soc. of Am., vol. 58, No. 2, February 1968, pp. 241–246.

DAVID SCHONBERG, Primary Examiner

R. J. STERN, Assistant Examiner

U.S. Cl. X.R.
350—162; 355—2